(12) United States Patent
Miškatović

(10) Patent No.: US 8,336,248 B2
(45) Date of Patent: Dec. 25, 2012

(54) AUTOMATIC BITE INDICATOR FOR FISHING

(76) Inventor: Željko Miškatović, Munich (DE)

( * ) Notice: Subject to any disclaimer, the term of this patent is extended or adjusted under 35 U.S.C. 154(b) by 0 days.

(21) Appl. No.: 12/994,237

(22) PCT Filed: May 25, 2009

(86) PCT No.: PCT/DE2009/000741
§ 371 (c)(1),
(2), (4) Date: Nov. 23, 2010

(87) PCT Pub. No.: WO2009/140957
PCT Pub. Date: Nov. 26, 2009

(65) Prior Publication Data
US 2011/0067290 A1     Mar. 24, 2011

(30) Foreign Application Priority Data

May 23, 2008   (DE) .......................... 10 2008 024 770

(51) Int. Cl.
*A01K 97/12*   (2006.01)
(52) U.S. Cl. .......................................................... 43/17
(58) Field of Classification Search ........................ 43/17
See application file for complete search history.

(56) References Cited

U.S. PATENT DOCUMENTS 4,125,957 A * 11/1978 Cunningham ..................... 43/17
4,693,125 A *  9/1987 Krutz et al. ......................... 43/17

(Continued)

FOREIGN PATENT DOCUMENTS
DE         4439356 A1 *   5/1996
(Continued)

OTHER PUBLICATIONS

Written Opinion of the International Searching Authority, Application No. PCT/DE2009/00741, Published Oct. 13, 2009.

(Continued)

*Primary Examiner* — Darren W Ark
(74) *Attorney, Agent, or Firm* — Altman & Martin; Steven K Martin

(57) ABSTRACT

The invention relates to an electronic bite display (5) for displaying that a fish (13) has bitten the bait that is attached to the fishing line of a fishing rod (2) that can be placed on a fishing rod holder (1), said fishing rod comprising a reel (3) for reeling in the fishing line. The sensor of the bite display is an electronic acceleration sensor (B) and said bite display (5) comprises a console (21) that is secured between the fishing rod holder and a fishing rod stand (8), that protrudes approximately horizontally in the position of use and extends approximately parallel to the fishing rod (2). A pivoting shaft (27) that can pivot about a pivoting axis and that extends horizontally in the position of use is provided on the console (21). One first end of a pivoting arm (31) is pivotably mounted on the pivoting shaft, the other end supports the housing of the bite display. A line clip-system (17) is mounted on the upper head part of the bite display in the position of use (rest position), said system can be detachably suspended temporarily on the fishing line clamped in the position of use (rest position), and the acceleration sensor (B) is arranged in the housing of the bite display (5), where it moves, vibrates or registers a swiveling downwards movement of the bite display and converts it simultaneously into a suitable electronic flow impulse corresponding to the optionally acoustic and/or optical display device (34, 35).

4 Claims, 8 Drawing Sheets

U.S. PATENT DOCUMENTS

| | | | |
|---|---|---|---|
| 4,731,946 A * | 3/1988 | Blythe et al. | 43/17 |
| 4,748,761 A * | 6/1988 | Machovina | 43/17 |
| 4,908,973 A * | 3/1990 | Perks | 43/17 |
| 5,450,687 A * | 9/1995 | Fox | 43/17 |
| 5,586,402 A * | 12/1996 | Brent et al. | 43/17 |
| 6,158,163 A * | 12/2000 | Fox | 43/17 |
| 6,308,452 B1 * | 10/2001 | Fox | 43/17 |
| 6,708,441 B2 * | 3/2004 | Dirito | 43/17 |
| 7,478,498 B1 * | 1/2009 | Barnhart | 43/17 |
| 7,562,488 B1 * | 7/2009 | Perkins et al. | 43/17 |
| 7,624,531 B2 * | 12/2009 | Kirby | 43/17 |
| 7,934,338 B2 * | 5/2011 | Hope | 43/17 |
| 2003/0208947 A1 * | 11/2003 | Cramer | 43/17 |

FOREIGN PATENT DOCUMENTS

| | | | |
|---|---|---|---|
| DE | 10117980 A1 * | 10/2002 | |
| DE | 202005000132 U1 | 4/2005 | |
| EP | 422913 A1 * | 4/1991 | |
| EP | 0422913 A1 | 4/1991 | |
| EP | 602879 A1 * | 6/1994 | |
| EP | 682864 A1 * | 11/1995 | |
| EP | 897663 A1 * | 2/1999 | |
| EP | 948891 A1 * | 10/1999 | |
| EP | 1040755 A1 * | 10/2000 | |
| EP | 1234501 A1 * | 8/2002 | |
| EP | 1346636 A1 * | 9/2003 | |
| EP | 2141367 A1 * | 1/2010 | |
| EP | 2181591 A2 * | 5/2010 | |
| FR | 2786662 A1 * | 6/2000 | |
| FR | 2797562 A1 | 2/2001 | |
| FR | 2844426 A1 * | 3/2004 | |
| FR | 2852488 A1 * | 9/2004 | |
| FR | 2921230 A1 * | 3/2009 | |
| GB | 2143711 A * | 2/1985 | |
| GB | 2232863 A * | 1/1991 | |
| GB | 2260676 A * | 4/1993 | |
| GB | 2267805 A * | 12/1993 | |
| GB | 2274761 A * | 8/1994 | |
| GB | 2305342 A * | 4/1997 | |
| GB | 2307161 A * | 5/1997 | |
| GB | 2313281 A * | 11/1997 | |
| GB | 2319157 A * | 5/1998 | |
| GB | 2335338 A * | 9/1999 | |
| GB | 2340016 A * | 2/2000 | |
| GB | 2344266 A * | 6/2000 | |
| GB | 2352382 A * | 1/2001 | |
| GB | 2369761 A * | 6/2002 | |
| GB | 2398716 A * | 9/2004 | |
| GB | 2399266 A * | 9/2004 | |
| GB | 2426683 A | 6/2006 | |
| GB | 2441954 A * | 3/2008 | |
| GB | 2455129 A * | 6/2009 | |
| JP | 63287433 A * | 11/1988 | |
| JP | 01296932 A * | 11/1989 | |
| JP | 06125681 A * | 5/1994 | |
| JP | 2004201559 A * | 7/2004 | |

OTHER PUBLICATIONS

Examination Report of the German Patent Office, Application No. 10-2008-024770.7, Issued Feb. 13, 2009.

Grant Notice (Communication under Rule 71(3)) of corresponding European Patent Application No. 09749499.1 dated Sep. 16, 2011.

* cited by examiner

AUTOMATIC BITE INDICATOR FOR FISHING

The invention relates to an automatic bite indicator for indicating that a fish has bitten a piece of bait that is attached to the fishing line of a fishing rod which can be placed on a fishing rod holder and has a reel for reeling in the fishing line.

A commercially available bite indicator of this type reacts to pulling movements of the fishing line, wherein the latter drives a wheel which in turn addresses a light barrier that triggers a bite signal. Another bite indicator comprises a wheel which has magnetic strips and switches a reed contact on and off. In both cases, there is a certain degree of slip in the bite detection.

EP 0 422 913 B1 relates to a bite indicator comprising a mechanical sensor. The design and construction of this sensor are relatively complicated and therefore expensive. Furthermore, the complexity and complicated nature of this bite indicator reduces the enjoyment of use thereof and increases the manufacturing costs and selling price thereof to a not inconsiderable degree.

With the known bite indicators, very small bites can be detected in a way that is in practice only barely perceptible to the angler, if at all. Furthermore, the fishing line must be passed tightly over the wheel, which in turn makes it necessary to have a guide for the fishing rod. These components increase the weight and size of the known bite indicator housing. Moreover, the bite indicator is complicated to assemble and difficult to handle in such a way as to ensure an optimal and reliable bite detection.

A further disadvantage of the known bite indicators lies in the fact that a drop bite cannot be detected without an additional structure comprising a so-called "swinger". In the case that a drop bite initially remains undetected (e.g., when fishing at night), the angler has no further possibility for detecting this state in order to correct the setup of the fishing rod.

The object of the invention is therefore to provide a bite indicator of simple construction, having a small size and low weight, which consists on the whole only of a few components which are easy to assemble and can be handled without any problem, which bite indicator can be coupled to the fishing line in an extremely simple manner, operates without slip and reacts to very small and brief bites simply via the twitching and/or movements on the fishing line, and which then outputs corresponding optical and/or acoustic signals that are perceptible to the angler. By virtue of a simple design of the bite indicator provided for detecting a drop bite, this bite indicator is intended to manage to indicate a drop bite to the angler in a lasting and 100% reliable manner, without the need for additional further add-ons.

This object is achieved according to the invention in that the sensor of the bite indicator is an electronic acceleration sensor, in that the bite indicator has a bracket which is attached between the fishing rod holder and the fishing rod rest and which, in the position of use, protrudes approximately horizontally and runs approximately parallel to the fishing rod, in that a pivoting shaft which can pivot about the pivot axis and runs horizontally in the position of use is provided on the bracket, in that a first end of a pivoting arm is mounted pivotably on the pivoting shaft, the other end of said pivoting arm carrying the housing of the bite indicator, in that a line clip system is attached to the head part of the housing of the bite indicator, said head part being located at the top in the position of use (rest position), and can be detachably suspended temporarily on the fishing line which is tensioned in the position of use (rest position), the height axis of the housing of the bite indicator running substantially vertically, in that the housing of the bite indicator suspended on the line clip system and attached to the pivoting arm can be pivoted downwards through approximately 90° about the pivot axis under the force of gravity as the fishing line slackens and sags downwards as a result of the fish biting the bait, after which the height axis of the housing of the bite indicator runs substantially horizontally, and in that the acceleration sensor is arranged in the housing of the bite indicator, where it registers movements, shaking or a downward pivoting of the bite indicator and converts this simultaneously into suitable electronic current pulses for display devices which output acoustic and/or optical signals to the angler.

In contrast to the subject matter of EP 0 422 913 B1, the bite indicator according to the invention comprises an electronic sensor. This bite indicator is constructed in a simple manner in design terms from only a few individual parts. Display devices of the bite indicator according to the invention signal the anticipated bite event to the angler in the form of acoustic and/or optical signals. It is uncomplicated and inexpensive to produce and is highly valued by anglers due to its lightweight construction, ease of handling and reliable operation.

Since the bite indicator hangs from the fishing line by its own weight, no additional weight (swinger) is necessary in order to detect a drop bite.

The acceleration sensor is fixedly mounted in the housing of the bite indicator, that is to say that the sensor has a housing (5×5 mm) which has an underside and an upper side in relation to the vertical (direction of the force of gravity).

Regardless of how the sensor or the complete bite indicator is rotated relative to the vertical, this generates a certain basic tension. Whenever (after a "drop bite") the sensor has rotated or pivoted through 90° out of its original position (rest position), it generates a new basic tension after this change in position. This change in tension can then be evaluated or "interpreted" by the electronics.

A "lasting drop bite" is understood as follows: Once the bite indicator has rotated or pivoted through 90 degrees, this state will be able to be detected for as long as the bite indicator is in this position. "Lasting" means: until the angler has redeployed and reset the fishing rod.

In the case of bite indicators presently available on the market, it is possible to detect a drop bite only while said drop bite is occurring. A "swinger" (like the bite indicator according to the invention) moves downwards and drives the wheel by virtue of the fishing line.

The production costs of the bite indicator according to the invention are low. The assembly, operation and maintenance thereof are easy and problem-free. The bite detection takes place—as mentioned—through very slight twitching or movements of the fishing line, which are transmitted via the fishing line and via the line clip system directly to the highly sensitive electronics of the bite indicator. In order to relieve the load on the angler when transporting his angling equipment, the size of the bite indicator should be as small as possible. Its power supply should be small so as to save space and should have an operating time that is as long as possible before a new battery has to be inserted. In order to detect a so-called drop bite, no additional attachment or add-on is necessary in order to indicate a drop bite to the angler in a lasting and 100% reliable manner.

The invention will be explained in more detail below on the basis of one preferred embodiment. In the drawings:

FIG. 1 shows a schematic view of the fishing rod 2 mounted on a fishing rod holder 1 and a fishing rod rest 8 and with a taut fishing line, to which the housing of the bite indicator 5 according to the invention is attached;

FIG. 2 shows an enlarged detail view of the arrangement of the bite indicator according to the invention on the fishing rod;

FIG. 3 shows a schematic view of the fishing rod 2 mounted on a fishing rod holder 1 and a fishing rod rest 8 and with a slack fishing line (9), to which the housing of the bite indicator 5 according to the invention is attached;

FIG. 4 shows an enlarged detail view of the arrangement of the bite indicator according to the invention on the fishing rod 2 in the case of detachment of the bite indicator (5) or of the line clip system 7 from the fishing line (9), brought about by a strong bite or by a sustained pulling of a fish on the fishing line 9;

FIG. 5 shows an enlarged detail view of the arrangement of the bite indicator according to the invention on the fishing rod 2 in the case of detachment of the bite indicator (5) or of the line clip system 7 from the fishing line (9), brought about by the fishing rod 2 being struck or lifted;

Figure 1:
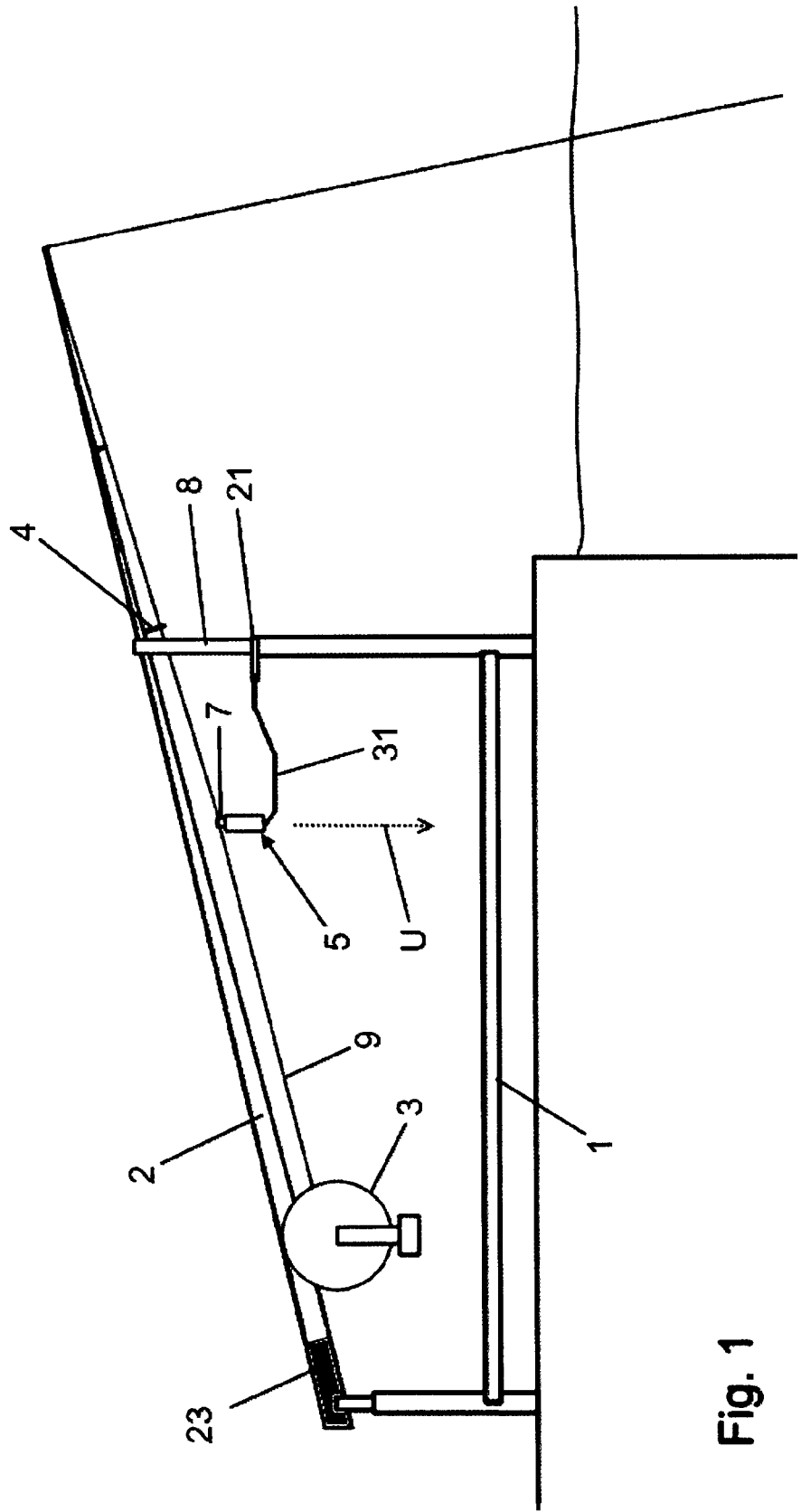
Figure 2:
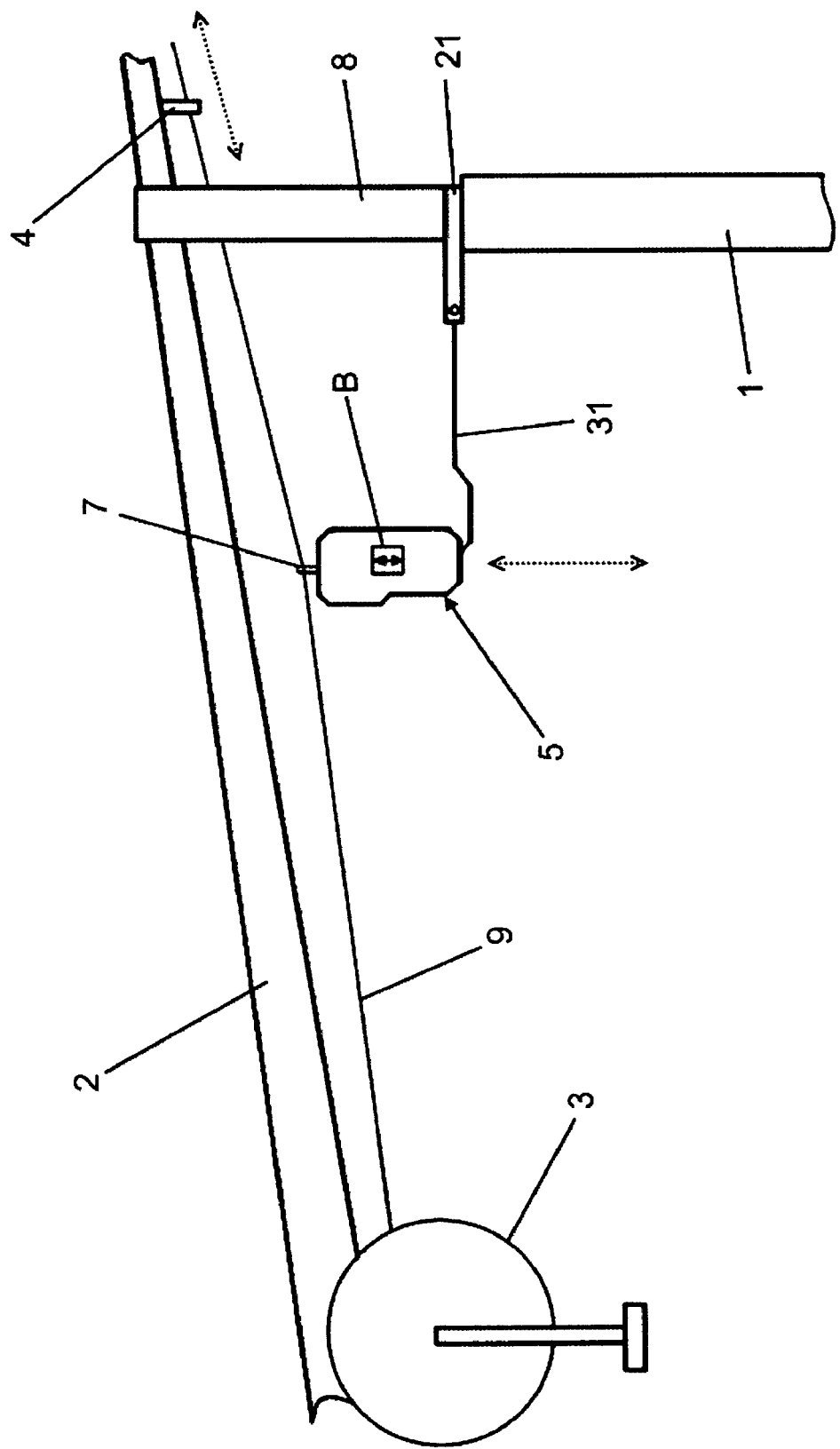

FIGS. 1 and 2 show a commercially available, height-adjustable fishing rod holder 1 (a so-called "rod pod" or "bank stick") with a fishing rod rest 8. In the normal angling mode, there is mounted on the rod rest 8 a fishing rod 2, to which a reel 3 for reeling in a fishing line 9 is attached.

Figure 6:
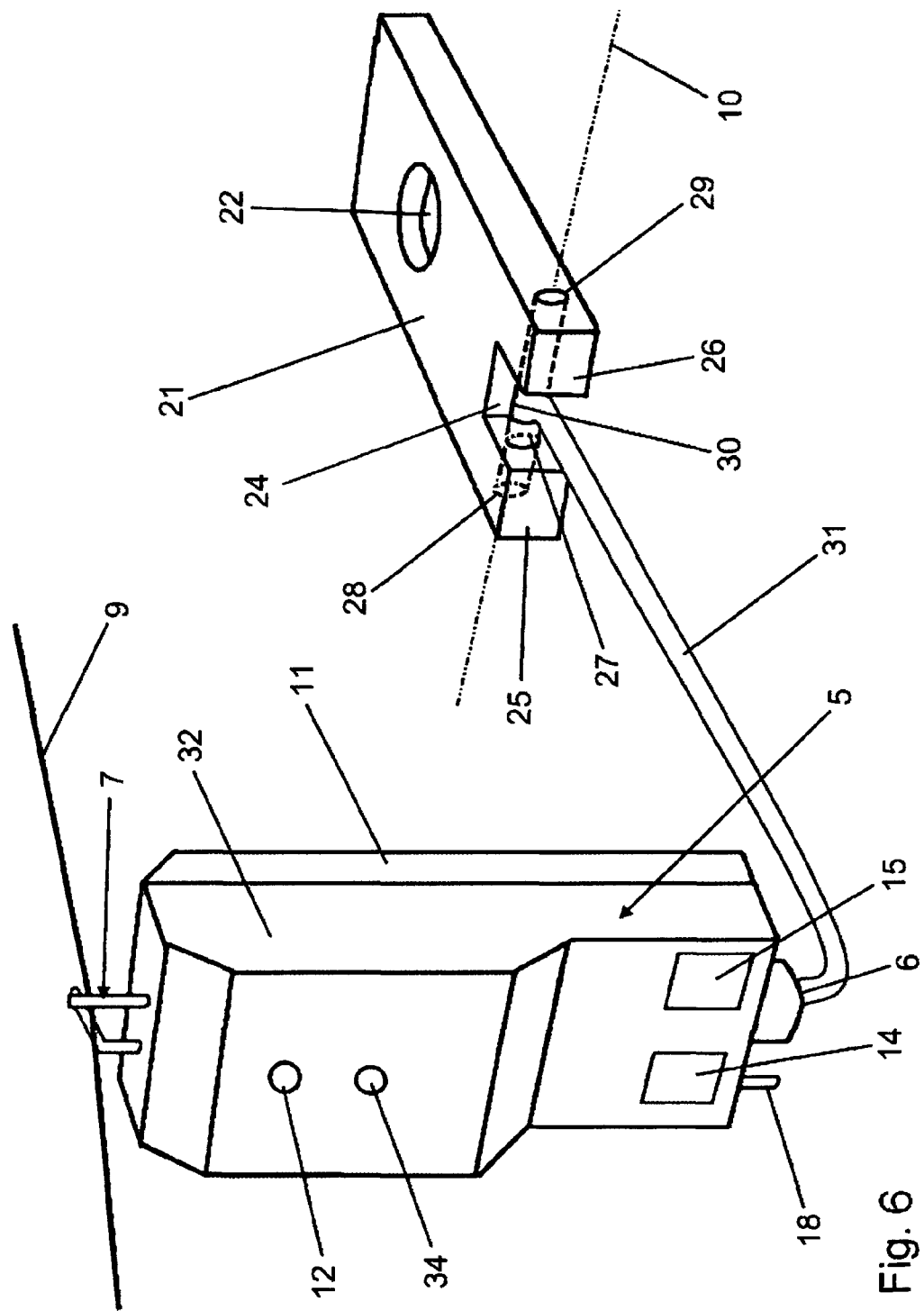
FIG. 6 shows an enlarged view of the bite indicator 5 according to the invention.

As shown in FIG. 6, a bracket 21 is securely screwed on between the fishing rod holder 1 and the fishing rod rest 8, wherein the bracket part that protrudes towards the fishing rod handle 23 runs approximately parallel to the fishing rod 2. The bracket 21 has a mounting hole 22.

The bracket 21 has at its protruding end a recess 24 which is arranged as centrally as possible so that a support arm 25, 26 is formed on each side thereof. The support arms 25, 26 are connected by a pivoting shaft 27, wherein each shaft end 28, 29 is mounted on a respective one of the two support arms 25, 26. The end 30 of a pivoting arm 31 is mounted on the pivoting shaft 27 in the region of the recess 24 between the two support arms 25, 26. Said pivoting arm can be pivoted vertically upwards or downwards about the pivot axis 10 in the position of use (rest position) of the fishing rod holder 1. Fixedly attached to the other end of the pivoting arm 31 is the lower part of a housing 32 of a bite indicator 5 according to the invention. Arranged on the upper part of the housing 32 is a so-called line clip system 7 which serves for temporarily suspending the bite indicator 5 on the fishing line 9. By virtue of this arrangement, the bite indicator 5 "hangs" from the fishing line 9 and exerts a certain tension on the fishing line 9 due to its own weight.

The diagram in FIG. 1 shows the arrangement according to the invention in its position of use (rest position), wherein the fishing line 9 is pulled taut due to the pulling force of the fishing hook weighted with a lead weight.

Figure 3:
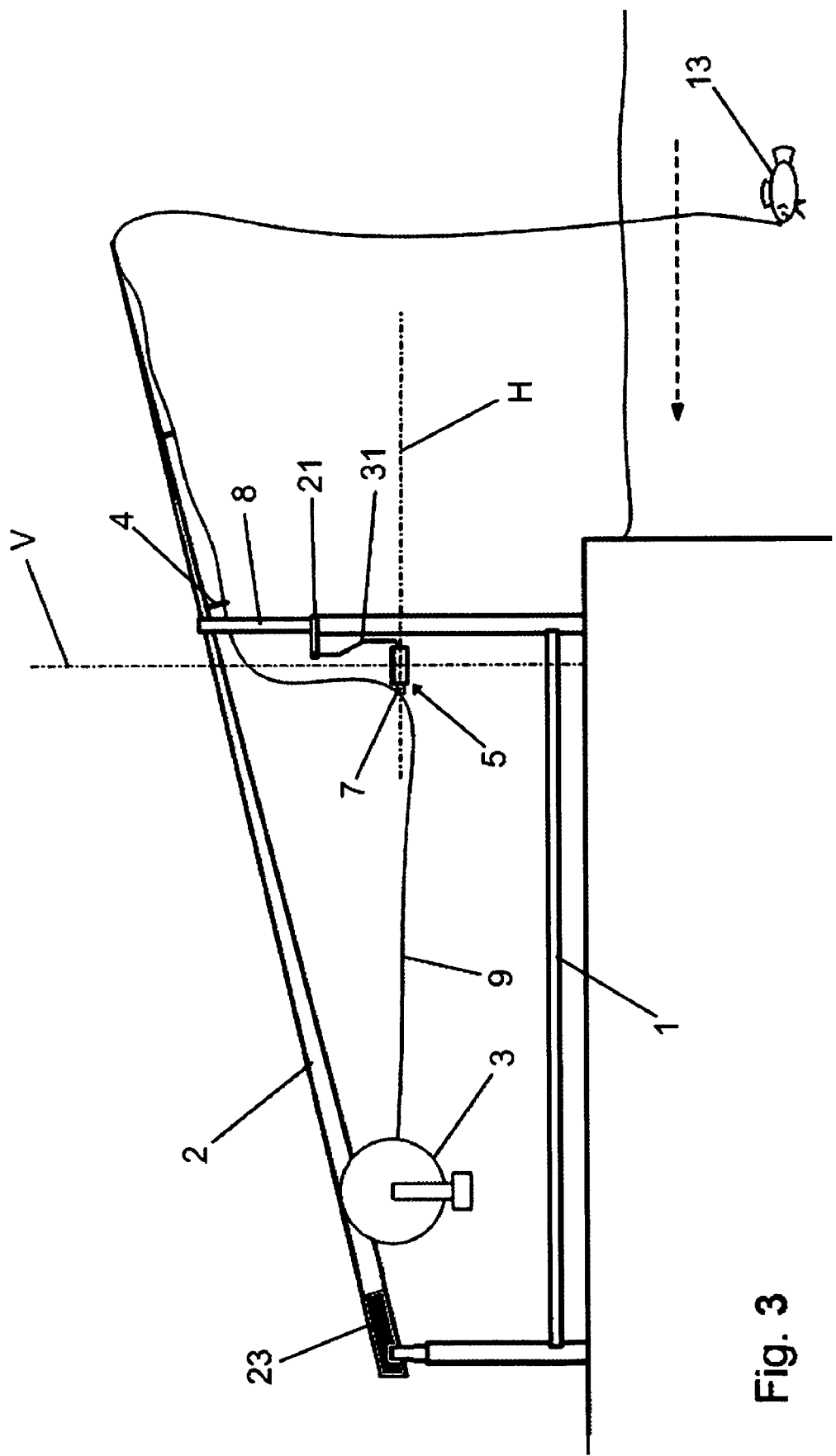

FIG. 3 shows the arrangement according to the invention after a fish 13 has bitten and grasped the lead-weighted bait suspended deep in the water and is in the process of moving it towards the bank area. As a result, the fishing line 9 is slackened so that the bite indicator 5 suspended thereon pulls the fishing line 9 downwards on account of its weight. As a result, the pivoting arm 31 carrying the bite indicator 5 pivots downwards through 90° about the pivot axis 10 of the pivoting shaft 27, as shown in FIG. 3 ("working position"). Due to the 90° pivoting of the pivoting arm 31, the initially vertically running height axis H of the housing 32 of the bite indicator 5 pivots downwards (FIGS. 1 and 2), after which it then runs horizontally (FIG. 3). The change in position of the bite indicator 5 is shown schematically in FIG. 4.

Due to the biting or pulling on the fishing bait and/or due to the latter being transported into shallower water by the fish 13, the fishing line 9 is moved to a greater or lesser extent. Via the fishing line 9 and via the line clip system 7 of the bite indicator 5 suspended thereon, these movements are transmitted directly to the bite indicator 5 and to the electronics installed therein and to the acceleration sensor B, as will be described below.

Using a MEMS acceleration sensor B, the electronics of the bite indicator 5 convert even very fine or very small movements acting on the fishing line 9 into an electrical voltage. The bite indicator 5 is thus able to detect very small and also individual movements or accelerations. Any movement or any bite of a fish is indicated by a flashing of a signal lamp 34 and/or by a beeping of a buzzer 35. The information concerning the last bite is at the same time stored for the angler for 30 seconds. This measure relieves the burden on the angler; he need not constantly watch the fishing line 9 or the fishing rod 2 with a high degree of concentration.

A MEMS (Micro-Electro-Mechanical System) is a combined arrangement of mechanical elements, such as sensors, actuators and electronic circuits, on a substrate or chip.

The detection of a bite of a fish will be described once more in greater detail with reference to the diagram in FIG. 2. When a fish bites, the fishing line 9 is moved back and forth through the fishing line ring guide 4. This horizontal movement is converted at the bite indicator 5 into a vertical movement as described above. The resulting vertical movement is detected by the MEMS acceleration sensor B. The rest of the electronics in the bite indicator 5 convert these sensor signals into acoustic and/or optical signals.

The case of a so-called "drop bite" will be described in greater detail with reference to FIG. 3. A "drop bite" is understood to mean a situation in which a fish moves the bait in the direction of the bank or in the direction of the fishing rod 2 and leaves the bait again at a certain point. In this situation, no further bite detection is possible. The bite indicator 5 no longer exerts any tension on the fishing line 9.

In this situation, the housing of the bite indicator 5 would pivot downwards through 90° from its originally vertical position into a horizontal position, as explained above.

Figure 4:
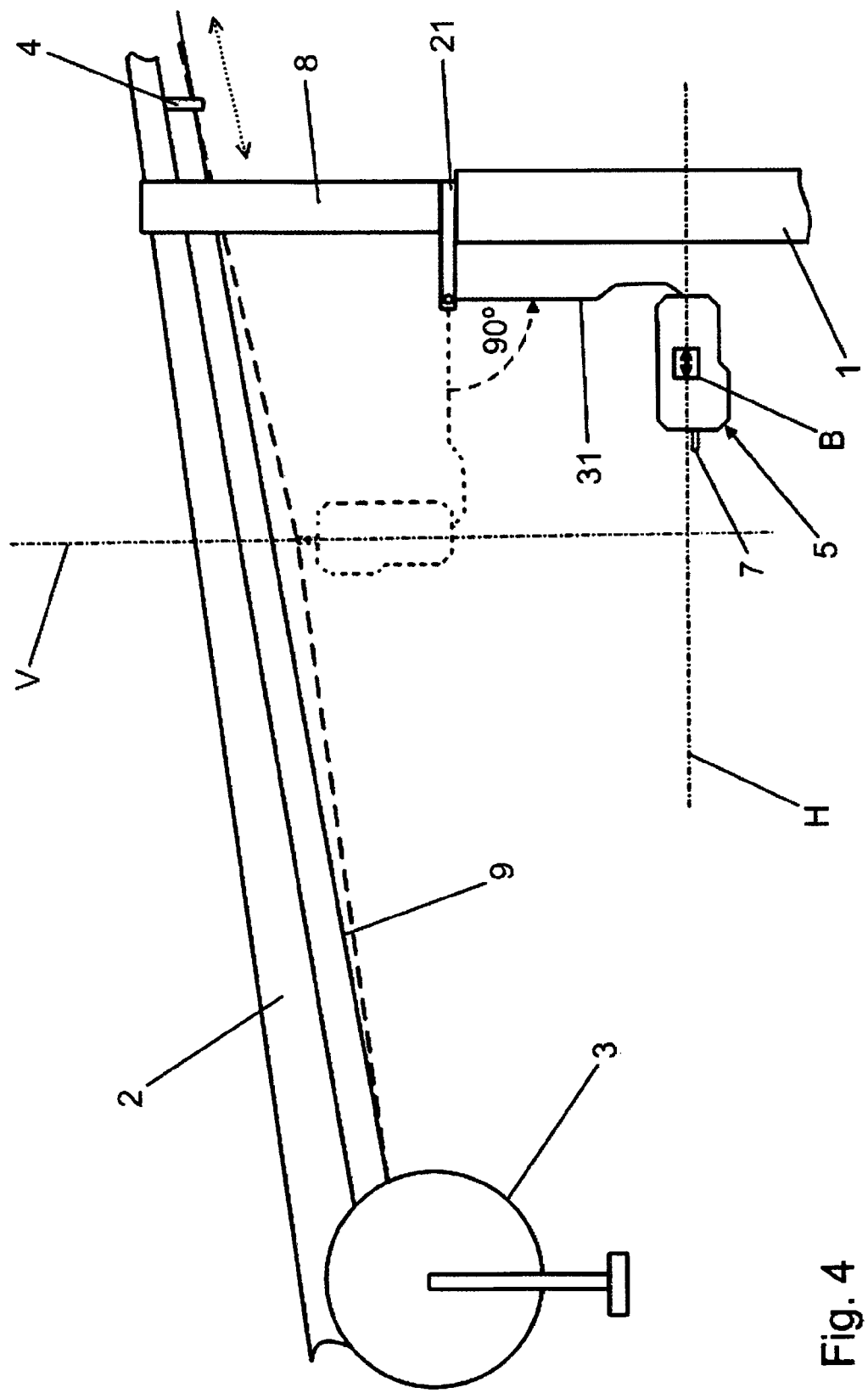

The case of a "strong bite" or of a continuous pulling of a fish 13 on the fishing line 9 will be described in greater detail with reference to FIG. 4. In such a situation, it may happen that the bite indicator 5 or the line clip system 7 detaches from the fishing line 9. In this case, the height axis H of the housing 32 of the bite indicator 5 would pivot downwards through 90°.

The bite indicator 5 according to the invention can "detect" its change in position. As soon as the height axis H of the bite indicator 5 pivots downwards through an angle of 90°, the acceleration sensor B outputs a certain voltage. This is converted by the electronics into a constant flashing and beeping at approximately 4 Hz. Due to this aggressive type of signal, the angler is aware that a "drop bite" or a "strong bite" is occurring.

Figure 5:
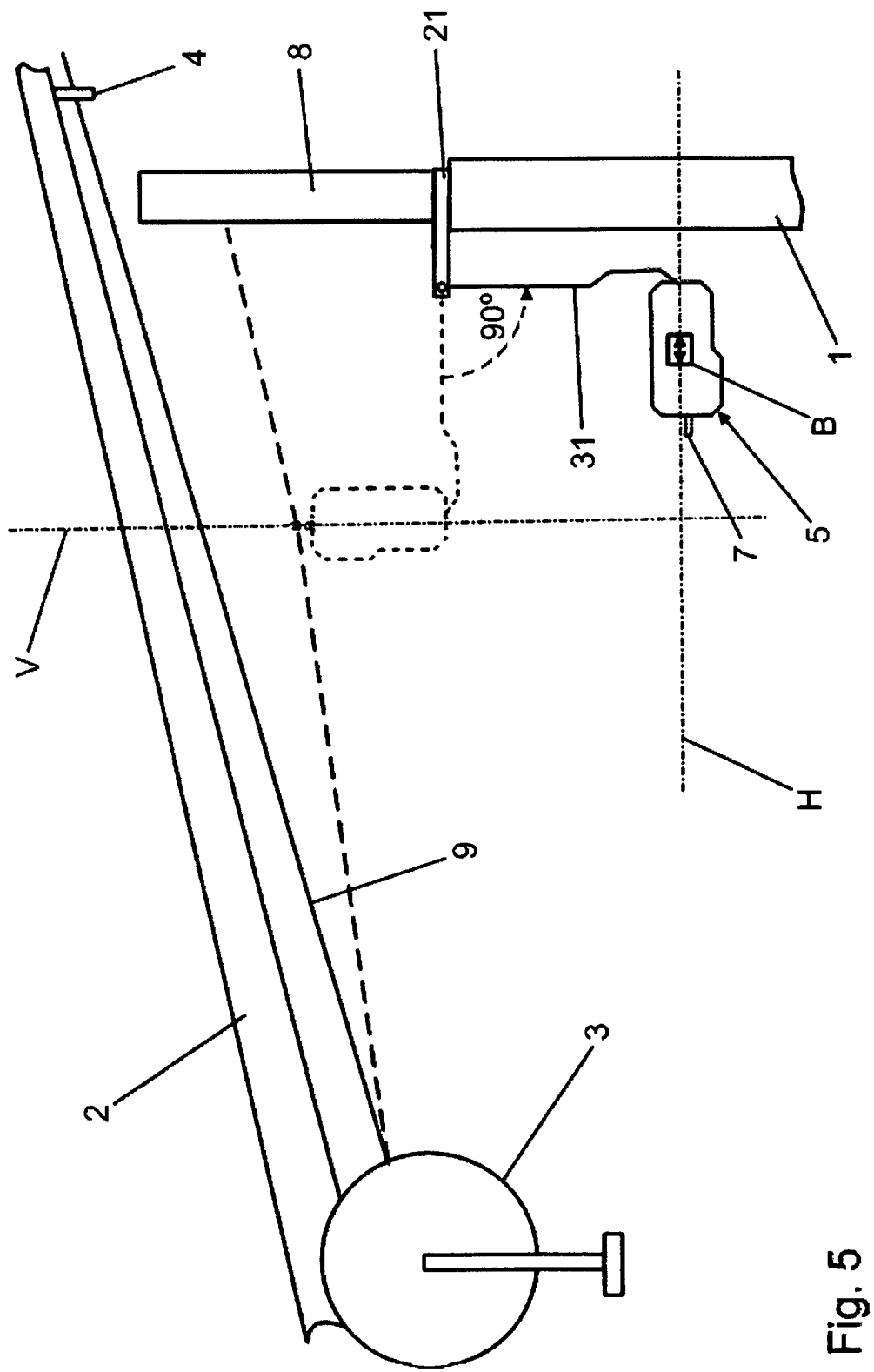

FIG. 5 shows the case when the rod is struck. In this case, the line clip system 7 must detach from the fishing line 9. The line clip system 7 is specially developed for monofilament and braided fishing lines 9 which hold the bite indicator 5 when taut (FIG. 2), and releases the fishing line 9 immediately when struck (FIG. 5). In other words, the line clip system 7 is fixedly connected to the bite indicator 5 and can thus transmit movements of the fishing line 9 to the acceleration sensor B.

FIG. 6 shows the design of the bite indicator 5 according to the invention. The bite indicator line clip system 7 has the function of connecting the bite indicator 5 (that is to say the entire structure thereof) to the fishing line 9. When the fishing rod 2 (FIGS. 2 and 3) is removed from the rod rest 8 (FIG. 5), the line clip system 7 must be able to detach from the fishing line 9. This is possible since the two retaining pins of the line clip system 7 are mounted in a manner slightly offset from one another. A signal lamp 34 has the function of displaying bites or movements through optical signals. A buzzer opening 12 is positioned above the buzzer 35 in the housing 32 so that the acoustic signal is not too greatly damped. A battery compartment 11 for a power-supplying battery 17 is provided on the rear side of the bite indicator 5. Via the two buttons 14 and 15, it is possible to adjust the volume of the buzzer 35 and to adapt the sensitivity of the bite indicator 5 to the environment.

Figure 7:
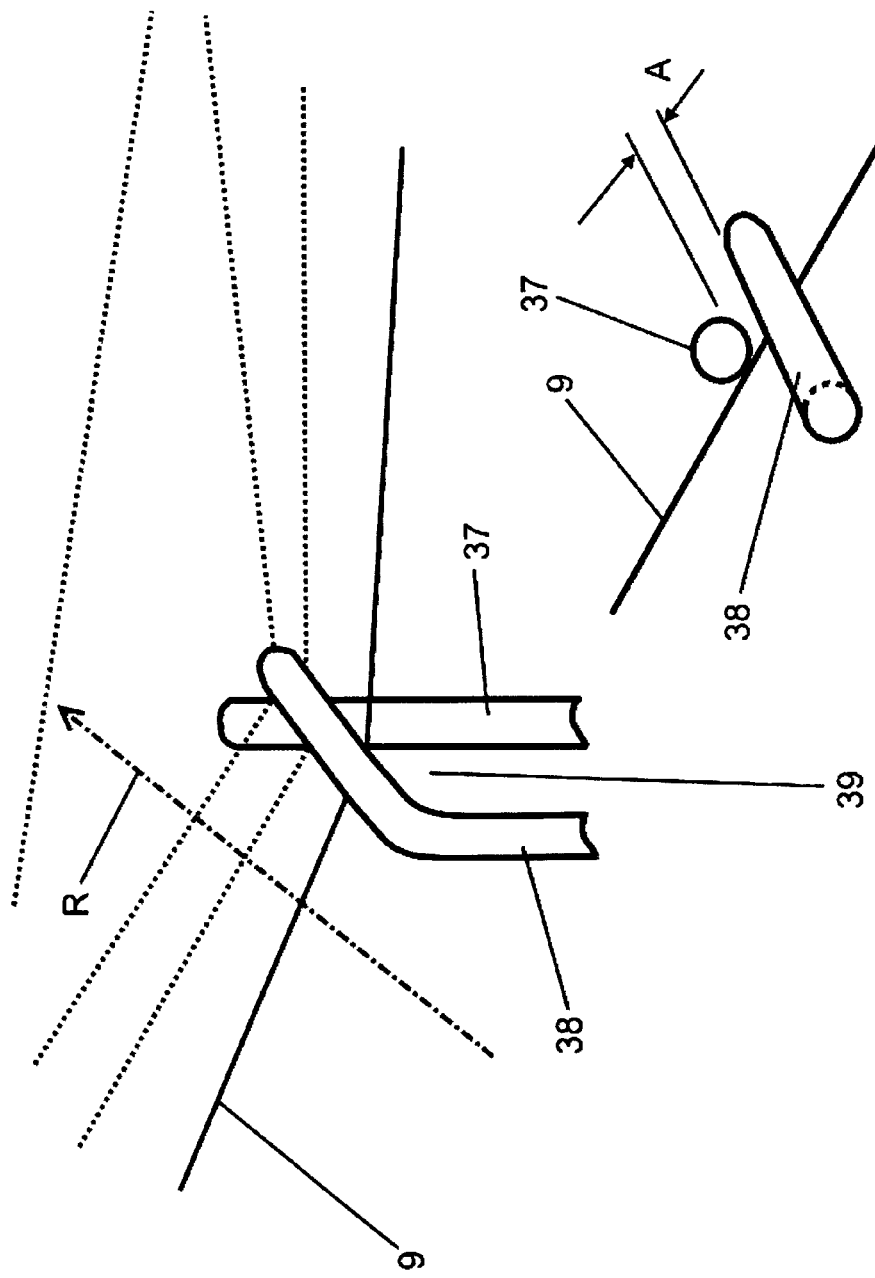
FIG. 7a shows an enlarged detail side view of the line clip system 7 according to the invention.
FIG. 7b shows an enlarged detail plan view of the line clip system 7 according to the invention.

A line clip system 7 according to the invention is shown in two enlarged views in FIGS. 7a and 7b. The line clip system 7 has on its head part, which is located at the top in the position of use (rest position), two retaining pins 37, 38 arranged at a distance A from one another. In the position of use (rest position), the fishing line 9 is passed through the intermediate space A formed by the two retaining pins 37, 38. A first retaining pin 37 runs straight upwards in the position of use (rest position). The second retaining pin 38 likewise runs upwards in the position of use (rest position), but its end is angled as shown in FIG. 7a. The two spaced-apart retaining pins 37, 38 not only form in the position of use (rest position) a type of "needle eye" or "guide eye" 39 for the fishing line 9 threaded through between them, but also secure the bite indicator 5 to the fishing line 9.

Due to its own weight and the effect of gravity, the bite indicator 5 hangs downwards in the direction U from the fishing line 9 in the position of use (rest position) of the fishing rod 2. In the position of use (rest position), the bite indicator 5 cannot and will not detach from the fishing line 9 threaded between the two retaining pins 37, 38.

In the event of the fishing rod 2 being struck or removed or under the effect of a relatively high pulling force in the direction R away from the rod rest 8, it must be ensured that the fishing line 9 can detach from the line clip system 7. This is possible because the two retaining pins 37, 38 of the line clip system are spaced apart by a distance A of approximately 1 millimeter. The two retaining pins 37, 38 are made from rust-proof materials. They therefore cannot corrode even after a relatively long period of use in the open air, which serves to protect the fishing line 9. Stainless steel is the optimal material since fishing lines 9 exhibit good sliding properties on stainless steel. The distance A of 1 millimeter guarantees a good functionality (reliable detachment of the bite indicator 5) in the case of both monofilament and braided fishing lines 9.

Figure 8:
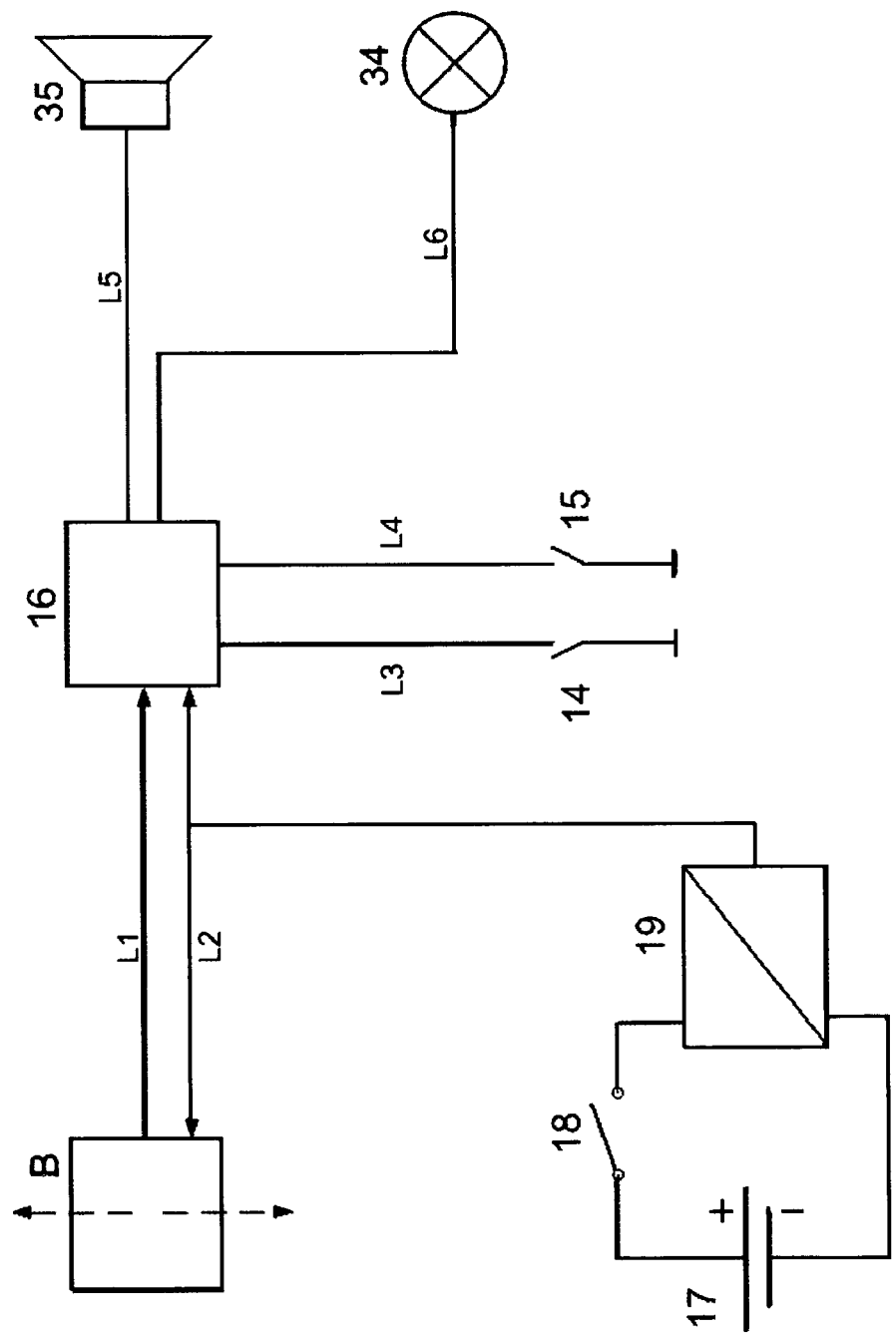
FIG. 8 shows a view of the electronic circuit and of the acceleration sensor B according to the invention.

A block diagram of the electronic circuit S according to the invention is shown by way of example in FIG. 8. In the rest state independent of the vertically running height axis H of the housing 32 of the bite indicator 5, the sensor outputs voltages of between 1.0 V and 1.5 V. The smallest movements via the fishing line (FIGS. 1, 2 and 3) are converted into a voltage proportional to the movement or acceleration. This voltage is modulated or added onto the basic voltage (brought about by the vertical arrangement of the height axis H of the bite indicator 5). The signal from the acceleration sensor B is passed through the line L1 to a microcontroller 16. Here, the microcontroller 16 experiences any movement of the bite indicator 5 through the basic voltage, through the position of the acceleration sensor B ("drop bite" detection—FIG. 2) and through occurring AC voltages. This information is forwarded from the microcontroller 16 via the signal lines L5 and L6 to the signal lamp 34 and the buzzer 35. The angler is thus informed both optically and acoustically about a bite of a fish 13 that has taken place, and can react accordingly and in good time depending on the situation transmitted to him.

All the electronics of the bite indicator 5 are supplied by a 1.5 Volt battery 17. It is connected via a main switch 18 to a voltage converter 19. The voltage converter 19 has the task of generating a stable 3.3 Volt voltage for the microcontroller 16 and the sensor B. In order to spare the battery voltage, a microcontroller 16 from the company Texas Instruments® is used. This family of microcontrollers 16 is aimed at being extremely energy-saving. By appropriate management, the microcontroller 16 is not operated continuously. It remains switched on only for 200 microseconds out of every 60 milliseconds or so. This is followed by the evaluation of the sensor data via the line L1. After the evaluation, the buzzer 35 and the signal lamp 34 are actuated according to the sensor signals. The microcontroller 16 is switched off until the next cycle.

When angling, essentially three different possibilities are conceivable, which are intended to be displayed as follows:

Scenario 1 (Desired Scenario):

The fish has bitten, the angler wants to land the fish. He must take the fishing rod in his hand; in doing so, the bite indicator would get in his way. He might break the line or else the bite indicator (clip system) might possibly be broken. The bite indicator must detach from the fishing line.

Scenario 2 (a Large Fish has Bitten, E.g., a Carp Weighing 10 kg):

The carp has strongly bitten. It pulls the fishing line suddenly (with very high acceleration) in the direction of the open water. This situation might cause a rapid movement (vertical movement) on the bite indicator. The line clip system might detach from the fishing line or slip out of the "needle eye". This situation must be perceived immediately by the angler since the carp might otherwise pull the entire rod including the accessories into the water. In this case, the bite indicator immediately drops downwards. The "drop bite" position will be detected (which is indicated by strong, aggressive flashing and beeping at approximately 4 Hz). If the pull of the fishing line is not sufficient to pull it out of the line clip system, it will also do nothing more. Due to the pulling of the fish, enough vibrations will be caused on the fishing line to generate sufficient optical and/or acoustic signals for the angler.

Scenario 3 (could Occur, but is Highly Unlikely):

The fish pulls the bait slowly towards the bank (sneaky "drop bite") and thus slowly slackens the fishing line. At some time or another, the 90° position of the bite indicator will occur, which is referred to as a "drop bite". If the angler has not noticed the situation beforehand based on the flashing/beeping, the fishing line might slip out of the line clip system. This might or might not be advantageous. It depends on the situation.

Advantage: The angler wants to pull the bait out in order to cast it to a new location. He need not remove the bite indicator by pulling the fishing line.

Disadvantage: The angler is happy with the position of the bait. He wants only to make the fishing line taut again. However, he must first resuspend the bite indicator.

Without significantly varying the concept of the invention, it is also conceivable that the tension and/or twitching movements of the fishing line 9 caused by a "drop bite" are detected by a sensor and converted into corresponding radio signals. The radio data could be transmitted by suitable means (which will not be explained in greater detail here) to appropriate receiving devices which generate and output acoustic and/or optical signals. These signals would enable the angler to take the necessary measures to retrieve the fish 13 hanging on the fishing line 9.

With the bite indicator according to the invention, it is possible to detect both lateral and horizontal movements of the bite indicator (5) via the acceleration sensor. This signal might contain the information that this is caused by interference, which nevertheless then also has to be interpreted as such and processed accordingly. Horizontal movements of the bite indicator (5) could thus be ignored and interpreted as "non-bites" and processed accordingly.

No bite is occurring, in other words interference is occurring, if the bite indicator (5) is moving vertically and horizontally. By contrast, a bite is occurring if the bite indicator (5) is moving only vertically.

Accordingly, the electronics of the bite indicator (5) are configured in such a way that they interpret horizontal movements of the bite indicator (5) (for example brought about by side winds) as interference and accordingly register these as "non-bites" and process them accordingly.

LIST OF REFERENCES 1 fishing rod holder
2 fishing rod
3 reel (for fishing line 9)
4 fishing rod guide ring (for fishing line 9—see FIG. 3)
5 bite indicator
6 first end (of the pivoting arm 31)
7 line clip system (consisting of the two retaining pins 37, 38)
8 rod rest
9 fishing line
10 pivot axis (of pivoting shaft 27)
11 battery compartment (for battery 17)
12 opening (for buzzer 35)
13 fish
14 button (for fine adjustment of the buzzer 35 and of the bite indicator 5)
15 button (for fine adjustment of the buzzer 35 and of the bite indicator 5)
16 microcontroller
17 battery
18 main switch
19 voltage converter
21 bracket element (for pivoting arm 31)
22 hole (through the bracket element 21)
23 fishing rod handle
24 recess (in bracket 22 for pivoting arm 31)
25 first support arm (in bracket 22 for pivoting shaft 27)
26 second support arm (in bracket 22 for pivoting shaft 27)
27 pivoting shaft (for pivoting arm 31)
28 first shaft end (of pivoting shaft 27)
29 second shaft end (of pivoting shaft 27)
30 second end (of pivoting arm 31)
31 pivoting arm (for housing 32 with bite indicator 5)
32 housing (for bite indicator 5)
34 signal lamp
35 buzzer
37 first retaining pin (of line clip system 7)
38 second retaining pin (of line clip system 7)
39 "needle eye" (between the two retaining pins 37, 38 for fishing line 9)
B MEMS—acceleration sensor
H height axis (of housing 32 with bite indicator 5)
V direction of the force of gravity
U pulling direction (of the bite indicator 5)
R pulling direction of the fishing line (for detachment from the line clip system 7)
L1 connecting line (between microcontroller 16 and acceleration sensor B)
L2 connecting line (between voltage converter 19, microcontroller 16 and acceleration sensor B)
L3 connecting line (between microcontroller 16 and button 14)
L4 connecting line (between microcontroller 16 and button 15)
L5 signal line (between microcontroller 16 and buzzer 35)
L6 signal line (between microcontroller 16 and signal lamp 34)
S electronic circuit

The invention claimed is:

1. An electronic bite indicator comprising a sensor for indicating that a fish has bitten a piece of bait that is attached to a fishing line of a fishing rod which can be placed on a fishing rod holder having a fishing rod rest, the fishing rod having a reel for reeling in the fishing line, wherein a bite display indicating that a fish has bitten a piece of bait takes the form of acoustic and/or optical signals triggered or generated by the bite indicator, characterized,
  (a) in that the sensor of the bite indicator (5) is an electronic acceleration sensor (B) of the Micro-Electro-Mechanical System type, which comprises a combined arrangement of mechanical elements, including actuators and electronic circuits on a substrate or chip,
  (b) in that the bite indicator (5) has a bracket (21) which is adapted to be attached between the fishing rod holder (1) and the fishing rod rest (8) and which, in a position of use, protrudes approximately horizontally and runs approximately parallel to the fishing rod (2),
  (c) in that a pivoting shaft (27) which can pivot about a pivot axis (10) and runs horizontally in the position of use is provided on the bracket (21),
  (d) in that a first end (6) of a pivoting arm (31) is mounted on the pivoting shaft (27) so as to be pivotable therewith, a second end (30) of said pivoting arm carrying a housing (32) of the bite indicator (5),
  (e) in that a line clip system (7) is attached to a head part of the housing (32) of the bite indicator (5), said head part being located at an upper-most position on said housing when in the position of use, and can be detachably suspended temporarily on the fishing line (9) which is tensioned in the position of use, the housing (32) having a height axis (H) running substantially vertically,
  (f) in that the housing (32) of the bite indicator (5) suspended on the line clip system (7) and attached to the pivoting arm (31) can be pivoted downwards through approximately 90° about the pivot axis (10) under the force of gravity as the fishing line (9) slackens and sags downward as a result of the fish (13) biting the bait, after which the height axis (H) runs substantially horizontally,
  (g) in that the electronic acceleration sensor (B) is arranged in the housing (32) of the bite indicator (5), where it registers movements, shaking or a downward pivoting of the bite indicator (5) and converts this simultaneously into suitable electronic current pulses for display devices (34, 35) which generate acoustic and/or optical signals for the angler, and
  (h) in that electronics of the bite indicator (5) are configured in such a way that the electronics interpret horizontal movement of the bite indicator (5) as interference and accordingly register these as non-bites and process them accordingly.

2. The bite indicator according to claim 1, characterized in that the line clip system (7) on the head part of the housing (32) of the bite indicator (5) consists of two retaining pins (37, 38) arranged at a distance (A) from one another, of which a first retaining pin (37) is straight and runs vertically upwards in the position of use and a second retaining pin (38) initially runs straight upwards in the position of use but then is bent at an angle towards the first retaining pin (37) so that the two retaining pins (37, 38) together form a type of needle eye or retaining eye (39), through which it is possible to pass the fishing line (9) which holds the line clip system (7) and the housing (32) of the bite indicator (5) attached thereto in their position of use.

3. The bite indicator according to claim 1, characterized in that a bite of a fish (13) on the fishing line (9) of the fishing rod (2) can be detected by the sensor (B) which processes the movements using suitable means to form signals which can be transmitted via power lines (L5, L6) or also via a transmitter/receiver system by radio to acoustic and/or optical signal devices (34, 35) in order to indicate the bite of a fish (13) to the angler.

4. The bite indicator according to claim 1, characterized in that a drop bite can be recognized automatically by the electronics of the bite indicator (5).

\* \* \* \* \*